United States Patent

Aoki

[11] 4,071,404
[45] Jan. 31, 1978

[54] RADIATION SHIELDING DEVICE FOR NUCLEAR FACILITIES

[75] Inventor: Masataka Aoki, Hitachi, Japan

[73] Assignee: Hitachi, Ltd., Japan

[21] Appl. No.: 749,803

[22] Filed: Dec. 13, 1976

[30] Foreign Application Priority Data

Dec. 22, 1975 Japan .................. 50-151805

[51] Int. Cl.² ............................ G21E 7/00
[52] U.S. Cl. ..................... 176/87; 176/19 R; 250/515; 176/DIG. 2
[58] Field of Search ........... 176/87, DIG. 2, 19 R; 250/515, 517

[56] References Cited

U.S. PATENT DOCUMENTS

| 3,192,069 | 6/1965 | Vogt et al. | 176/87 |
| 3,920,512 | 11/1975 | Sutherland | 176/87 |
| 3,934,457 | 1/1976 | Clark et al. | 176/19 R |

Primary Examiner—Harvey E. Behrend
Attorney, Agent, or Firm—Craig & Antonelli

[57] ABSTRACT

A pressure vessel of a nuclear reactor is bodily enclosed by an inner layer made of a heat insulating material and an outer layer made of a radiation shielding material, and a nozzle joined by welding to the pressure vessel and a pipe joined by welding to the nozzle projected outwardly from the pressure vessel to extend through openings formed in the two layers. A removable heat insulator detachably attached to an edge of the inner layer defining the opening is disposed in a manner to surround the nozzle. A shielding frame is secured to walls defining the opening in the outer layer, to provide a manhole through which the nozzle and the pipe extend. A plurality of radiation shielding blocks are hingedly supported by an outer end of the shielding frame which is remote from the pressure vessel, while a plurality of radiation shielding plates are hingedly supported by an inner end of the shielding frame which is near to the pressure vessel. When the nuclear reactor is in operation, the radiation shielding blocks are kept in a closed position to plug the manhole, while the radiation shielding plates are kept in an open position. If the nuclear reactor is shut down and inspection of the welds is performed, the radiation shielding blocks are opened, the heat insulator is temporarily removed from its position and some of the radiation shielding plates are closed whereby an open space between the nozzle and pipe and the shielding frame can be closed to avoid exposure of the whole-body of the inspector to radiation.

6 Claims, 2 Drawing Figures

RADIATION SHIELDING DEVICE FOR NUCLEAR FACILITIES

BACKGROUND OF THE INVENTION

This invention relates to a radiation shielding device for nuclear facilities, and more particularly to a radiation shielding device mounted at an opening formed in a radiation shield for a pressure vessel of a nuclear reactor to permit a nozzle and a pipe joined by welding to the pressure nozzle to extend therethrough which device can be freely brought to open and closed positions to prevent the whole-body of an inspector inspecting the welds from exposure to radiation.

With the progress of nuclear fission within a pressure vessel of a nuclear reactor, various kinds of radiation, such as alpha rays, beta rays, gamma rays and neutrons, are emitted by fission products. It is a well known fact that exposure to radiation can have toxic effects on human beings and can cause leukemia, tumors, other forms of cancer, cataract, sterility and the birth of freaks.

In order to preclude human beings from radiation exposure, the outer surface of the pressure vessel of the nuclear reactor is shielded by structures made of concrete, iron and lead. The pressure vessel has a nozzle and a pipe connected to the nozzle for introducing cooling water into and releasing steam from the pressure vessel. The nozzle is joined by welding to the pressure vessel, and the pipe is joined by welding to the nozzle. Inspection of the welds is carried out at regular intervals to avoid leakage of steam or gas therethrough.

The International Commission on Radiological Protection (I.C.R.P. for short) has recommended that the following guideline radiation figures be adopted for occupational exposures in order to prevent acute effectiveness of exposure to radiation and to set a tolerable level for late effected risk for workers engaged in the nuclear industrial shop:

1. An integrated dose: 5 (N-18) rem should be set as a limited amount of radiation to be accumulated in one year for persons of an age N;
2. A maximum permissible dose (MPD for short) for various parts of the human body: a strict standard should be set for exposure of the whole human body to radiation (a limit of 3 rem per one quarter year or 5 rem per one year) as compared with exposure of a part (the hand, foot, head, etc.) of the human body in such a ratio that the permissible dose for the former is one fifth to one ten-oddth the dose for the latter; and
3. A dose limit of planned special exposure to which workers in a nuclear-industrial shop may be subjected: a figure twice the figure set as MPD is permitted, but this figure should not be exceeded by the integrated dose of paragraph (1).

The inspectors who carry out the inspection of the welds at regular intervals of time should be protected from radiation damage such that the figure for permitted radiation which they receive should be below the aforementioned levels. The manner in which the regular inspection of the welds has hitherto been carried out will be described along with the construction of a radiation shielding device of the prior art used for preventing leakage of radiation.

There is provided an outer layer for shielding radiation which encloses the pressure vessel of the nuclear reactor in uniformly spaced relationship with the outer surface of the pressure vessel. Interposed between the outer layer and the pressure vessel is an inner layer for insulating heat which encloses the entire outer surface of the pressure vessel in spaced relationship.

A nozzle projecting outwardly from the pressure vessel and a pipe connected to the nozzle extend through openings formed in the inner layer and the outer layer.

A removable heat insulator consisting of a plurality of pieces to facilitate removal is detachably attached to an edge of the inner layer which defines the opening formed therein, so that a weld formed between the pressure vessel and the nozzle can be inspected readily.

To enable the removable heat insulator to be detached piece by piece from its position and conveyed to outside when inspection of the weld is performed, the material of the outer layer is removed at a portion thereof where the opening is formed, and a shielding frame is secured to walls of the opening, to provide a manhole of a size large enough to enclose the nozzle and the pipe and to permit the operator to enter therein to convey the heat insulator therethrough or to carry out weld inspection. A plurality of shielding blocks made of a radiation shielding material are removably attached to the shielding frame in such a manner that the shielding blocks close from outside an open space between the shielding frame and the pipe.

Ultrasonic inspection techniques are usually employed in inspecting the welds formed between the pressure vessel and the nozzle and between the nozzle and the pipe. Ultrasonic flaw detection is carried out while the inspector performing the inspection keeps a probe in direct contact with the welds to be tested for producing ultrasonic waves from the probe.

Generally the nozzle projects horizontally from the pressure vessel, so that it is necessary for the operator to move in the manhole defined by the shielding frame disposed horizontally while manually keeping the probe in contact with the welds to be tested.

To this end, the shielding blocks are first opened and then the heat insulator is removed piece by piece from its position by being conveyed through an open space between the pipe and the shielding frame.

After the welds have been exposed in this way, the inspector has access through the manhole to the welds and manually moves the probe along the welds so as to detect flaws, if any.

Of all the kinds of radiation released from the core of the reactor, gamma rays are predominantly large in amount as compared with alpha rays, beta rays and neutrons when regular inspection is carried out by shutting down the reactor. Gamma rays, which are a sort of electromagnetic waves, have the characteristic of decaying in inverse proportion to the square of the distance from the source of radiation. Assuming that the dose of radiation detected in the regular inspection position when the reactor is shut down is 4 roentgens per hour, this will be 4 rem per hour because one rem or gamma rays is the same as one roentgen of them. If the aforementioned recommendation made by the I.C.R.P. is observed strictly, an inspector would be able to carry out an inspection operation only for 45 minutes per one quarter year or 1 hour and 15 minutes per one year as long as exposure of the whole-human body is concerned.

Thus it becomes necessary to rely on human wave tactics in performing regular inspection of the welds. The prior art method of inspection has had the disadvantages of increased personnel expenses and other expenses, enhanced trouble caused by the need to provide protection from radiation damage, and some times a delay in carrying out the required inspection.

SUMMARY OF THE INVENTION

An object of this invention is to provide a radiation shielding device which is capable of minimizing the dose of radiation to which the inspector is subjected when performing the operation of inspecting at least one weld formed between a pressure vessel of a nuclear reactor and a nozzle projecting from the pressure vessel to extend through a radiation shielding layer of the nuclear reactor.

Another object is to provide a radiation shielding device which enables the inspection operator to be subjected only to localized exposure by avoiding whole-human body exposure when he performs the operation of inspecting at least one weld formed between the pressure vessel of the nuclear reactor and the nozzle projecting from the pressure vessel to extend through the radiation shielding layer of the nuclear reactor.

Still another object is to provide a radiation shielding device which permits personnel expenses to be reduced and the time required for inspection of a weld to be shortened when at least one weld formed between the pressure vessel and the nozzle projecting from the pressure vessel and extending through the radiation shielding layer is inspected.

The aforementioned objects of the invention can be accomplished by providing a plurality of shielding plates made of a radiation shielding material and hingedly supported by a radiation shielding layer in such a manner that an open space between a projection extending from the vessel exposed to radiation and the radiation shielding layer surrounding the vessel in its entirety can be partially and selectively opened or closed in a position in which the projection extends through the radiation shielding layer.

DESCRIPTION OF THE PREFERRED EMBODIMENT

Figure 1:
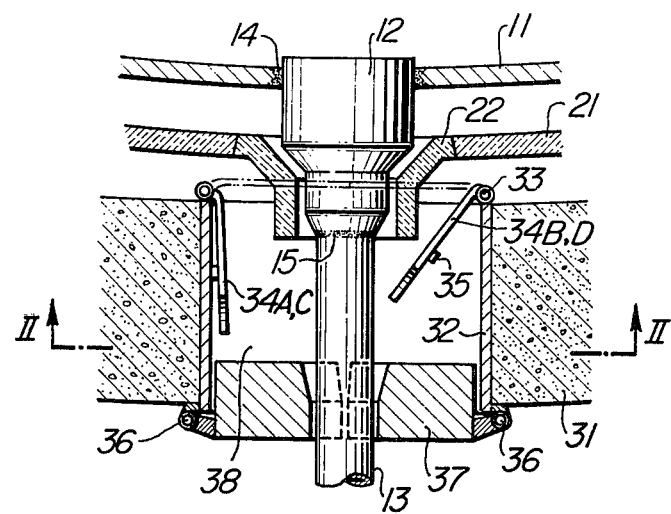
FIG. 1 is a fragmentary sectional view of one embodiment of the invention as applied to the nozzle extending portion of a pressure vessel.

A preferred embodiment of the invention as applied to a pressure vessel of a boiling-water type nuclear reactor will be described with reference to the accompanying drawings.

The pressure vessel of the nuclear reactor is designated by the reference numeral 11 and has a nozzle 12 formed by forging and projecting outwardly from the pressure vessel 11. The nozzle 12 is joined by welding at one end or inner end thereof to the pressure vessel 11 as shown at 14. The nozzle 12 has joined to the other end or outer end thereof by welding to one end of a pipe 13.

The pressure vessel 11 is surrounded in its entirety by an inner layer 21 made of a heat insulating material, with a predetermined clearance being provided between the outer periphery of the pressure vessel 11 and the inner layer 21. An outer layer 31 made of concrete is arranged to surround the inner layer 21 so as to shield radiation released from the pressure vessel 11.

The nozzle 12 and the pipe 13 extend outwardly from the pressure vessel 11 through openings formed in the inner layer 21 and the outer layer 31.

Welds 14 and 15 between the pressure vessel 11 and the nozzle 12 and between the nozzle 12 and the pipe 13 respectively are inspected regularly. In effecting the inspection, access is had to the welds by the operator who manually brings into contact with the welds a probe which transmits the ultrasonic vibration energy to the welds 14 and 15 being tested.

In order that the operator may have access from outside to the welds 14 and 15, portions of the inner layer 21 and the outer layer 31 in the vicinity of the nozzle 12 and the pipe 13 extending therethrough are constructed as presently to be described. The material of the outer layer 31 is removed from a portion thereof through which the nozzle 12 and the pipe 13 extend so as to form an opening therein. A shielding frame 32 of a square cross-sectional shape is secured to walls of the opening to provide a manhole 38 which is large enough for the inspector to enter thereinto to perform an inspection operation. The nozzle 12 and the pipe 13 extend through substantially the central portion of the manhole 38.

A heat insulator 22 consisting of a plurality of pieces for facilitating its removal from the inner layer 21 to outside through the manhole 38 in the outer layer 21 is in the form of a funnel when assembled and detachably attached to an edge of the inner layer 21 defining the opening formed therein to permit the nozzle 12 to extend therethrough.

When assembled, the heat insulator 22 has dimensions such that, if the heat insulator 22 is removed from its position, the operator in the manhole 38 can trace the welds 14 and 15 between the pressure vessel 11 and the nozzle 11 and between the nozzle 12 and the pipe 13 respectively without any difficulty by means of a probe.

Four vertical pins 36 are each attached to one side of an outer end of the shielding frame 32 or an end thereof remote from the pressure vessel 11, with each pin 36 hingedly supporting one shielding block 37 of a substantially square shape at its outer end so that the cylinder blocks 37 can be pivotally brought to a closed position in which they plug the interior of the manhole 38 and close an open space between the pipe 13 and the shielding frame 32 and to an open position in which they are moved away from the outer layer 31.

The shielding blocks 37, which are made of an iron base alloy, are normally disposed in the closed position when the nuclear reactor is in operation. The shielding blocks 37 are designed and specified in the specifications such that the dose of radiation outside the outer layer 31 is below the permissible level.

Four vertical pins 33 are also each attached to one side of an inner end of the shielding frame 32 or an end thereof near to the pressure vessel 11 and hingedly support one of shielding plates 34A, 34B, 34C and 34D at its outer end. The shielding plates 34A, 34B, 34C and 34D made of lead in thin sheet form can be pivotally moved toward the interior of the manhole 38 to bring the same to an open position. The shielding plates 34A, 34B, 34C and 34D are substantially square in shape and can substantially completely close an open space between the nozzle 12 and the shielding frame 32, when brought to a closed position after the heat insulator 22 has been removed from its position as aforesaid.

Figure 2:
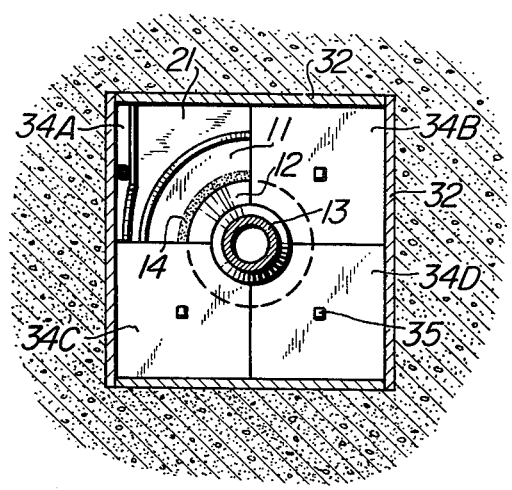
FIG. 2 is a view as seen in the direction of the arrow II-II of FIG. 1, with the heat insulator being removed.

FIG. 2 shows, in a sectional view, the shielding plates 34B, 34C and 34D in a closed position and only the shielding plate 34A in an open position after the heat insulator 22 has been removed from its position.

During the time the nuclear reactor is in operation, all the shielding plates 34A, 34B, 34C and 34D are kept in the open position in which they are attracted to walls of the shielding frame 32 and held in place by stoppers 35 comprising magnets.

In operation, when the dose of radiation released from the pressure vessel 11 is reduced below a predetermined level following a given period after the nuclear reactor is shut down. The shielding blocks 37 are all brought to their open position, and then the removable heat insulator 22 is removed piece by piece from the edge of the inner layer 21 and conveyed through the manhole 38 to outside.

Thereafter the shielding plates 34A, 34B, 34C and 34D are detached from the walls of the shielding frame 32 and brought to their closed position.

The weld inspector carrying with him a probe connected to an ultrasonic flaw detector (not shown) enters the manhole 38 and opens one of the four shielding plates 34. Then the inspector moves the probe along the weld 14 to trace the same to assess weld quality while avoiding whole-human body exposure to radiation by hiding behind the three shielding plates 34 in their closed position which are used as a radiation shield. The dose of radiation from the weld 15 to which the inspector would be subjected is about one tenth that from the weld 14 and is therefore negligible. However, inspection of the weld 15 is preferably carried out by bringing all the shielding plates 34 to a half-open position so that the inspector can hide himself behind the shielding plates 34 as much as possible to minimize the integrated dose which he would be exposed to.

In any case, since inspection of the welds 14 and 15 is carried out by the inspector who is shielded by the shielding plates 34, the inspector is exposed to less hazards of the radiation damage than when he is engaged in assessing of weld quality in nuclear facilities provided with a radiation shielding device of the prior art, because there is less chance of the exposure to the radiation released from the pressure vessel if this invention is carried into practice. Thus the present invention is capable of reducing a dose of radiation to which the inspector is subjected.

After completion of the inspection, the shielding plates 34 are all brought to their open position, the removable heat insulator 22 is conveyed through the manhole 38 back to its original position at the edge of the inner layer 21, and finally the shielding blocks 37 are closed.

In the embodiment shown and described hereinabove, the invention has been described as being applied to portions of the heat insulating layer and the radiation shielding layer for the pressure vessel through which the nozzle and the pipe extend from the pressure vessel. It is to be understood, however, that the description is by way of illustration only and that the invention is not limited to the specific embodiment described. Instead, the invention can have wide application where inspection of welds, etc. is carried out in any portions of nuclear facilities, such as used fuel reprocessing facilities, in which exposure of the inspector to the radiation gives rise to the problem of increased biological hazards caused to the inspector by radiation damage.

What is claimed is:

1. A radiation shielding device for nuclear facilities comprising:

a vessel exposed to fissible materials;
   a radiation shielding layer surrounding said vessel;
   a nozzle joined at one end thereof by welding to said vessel;
   a pipe joined at one end thereof by welding to the other end of said nozzle and extending through said radiation shielding layer;
   a shielding frame secured to walls of an opening formed in said radiation shielding layer to define therein a manhole, said nozzle and said pipe extending through substantially the central portion of the manhole in spaced relation with the walls of said shielding frame;
   a plurality of shielding blocks made of a first radiation shielding material and each hingedly supported at one end thereof by an outer end of said shielding frame or an end thereof remote from said vessel, said shielding blocks being adapted to plug the manhole and close an open space formed between said pipe and said shielding frame when said shielding blocks are all pivotally brought to a closed position; and
   a plurality of shielding plates made of a second radiation shielding material and each hingedly supported at one end thereof by an inner end of said shielding frame or an end thereof near to said vessel, said shielding plates being adapted to close an open space formed between said nozzle and said shielding frame when said shielding plates are all pivotally brought to a closed position.

2. A radiation shielding device for nuclear facilities comprising:

a vessel exposed to fissile materials;
   a heat insulating layer surrounding the vessel;
   a radiation shielding layer surrounding said heat insulating layer;
   a nozzle joined at one end thereof by welding to said vessel;
   a pipe joined at one end thereof by welding to the other end of said nozzle;
   a shielding frame secured to walls of an opening formed in said radiation shielding layer to define therein a manhole, said nozzle and said pipe extending through substantially the central portion of the manhole in spaced relation with the walls of said shielding frame;
   a plurality of shielding blocks made of a first radiation shielding material and each hingedly supported at one end thereof by an outer end of said shielding frame or an end thereof remote from said heat insulating layer, said shielding blocks being adapted to plug the manhole and close an open space formed between said pipe and said shielding frame when said shielding blocks are all pivotally brought to a closed position; and
   a plurality of shielding plates made of a second radiation shielding material and each hingedly supported at one end thereof by an inner end of said shielding frame or an end thereof near to said heat insulating layer, said shielding plates being adapted to close an open space formed between said nozzle and said shielding frame when said shielding plates are all pivotally brought to a closed position.

3. A radiation shielding device according to claim 2, wherein said shielding blocks are made of an iron base alloy and said shielding plates are made of lead.

4. A radiation shielding device according to claim 2, wherein said shielding frame is square in cross-sectional shape, and said shielding blocks and said shielding plates are both four in number and substantially square in shape.

5. A radiation shielding device according to claim 3, wherein said shielding frame is square in cross-sectional shape, and said shielding blocks and said shielding plates are both four in number and substantially square in shape.

6. A radiation shielding device for nuclear facilities comprising:

a vessel exposed to fissile materials;

a heat insulating layer surrounding said vessel;

a radiation shielding layer surrounding said heat insulating layer;

a nozzle joined at one end thereof by welding to said vessel and extending through an opening formed in said heat insulating layer;

a pipe joined at one end thereof by welding to the other end of said nozzle;

a heat insulator consisting of a plurality of pieces made of a heat insulating material and detachably attached to an edge of the opening formed in said heat insulating layer for said nozzle to extend therethrough so that said heat insulator is disposed around said nozzle;

a shielding frame secured to walls of an opening of a substantially square cross-sectional shape formed in said radiation shielding layer to define therein a manhole, said nozzle and said pipe extending through substantially the central portion of the manhole in spaced relation with the walls of said radiation shielding frame;

four shielding blocks made of an iron base alloy which are substantially square in shape and equal in size, each of said four shielding blocks hingedly supported at one end thereof by one side of an outer end of said shielding frame or an end thereof remote from said heat insulating layer, said four shielding blocks being adapted to plug the manhole and close an open space formed between said pipe and said shielding frame when said four shielding blocks are all pivotally brought to a closed position; and four shielding plates made of lead which are substantially square in shape and equal in size, each of said four shielding plates hingedly supported at one end thereof by one side of an inner end of said shielding frame or an end thereof near to said heat insulating layer, said four shielding plates being adapted to close an open space formed between said nozzle and said shielding frame when said four shielding plates are all pivotally brought to a closed position after said heat insulator has been detached from said heat insulating layer and conveyed through the manhole out of said heat insulating layer.

* * * * *